United States Patent
Brown

(10) Patent No.: US 6,381,667 B1
(45) Date of Patent: *Apr. 30, 2002

(54) METHOD FOR SUPPORTING MULTIPLE DELAYED READ TRANSACTIONS BETWEEN COMPUTER BUSES

(75) Inventor: Jeffrey R. Brown, Minnetonka, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/352,721

(22) Filed: Jul. 13, 1999

(51) Int. Cl.⁷ ................ G06F 13/14; G06F 13/40
(52) U.S. Cl. ........................... 710/313; 710/305
(58) Field of Search .............................. 710/305

(56) References Cited

U.S. PATENT DOCUMENTS

| | | | | |
|---|---|---|---|---|
| 5,533,204 A | | 7/1996 | Tipley .................. | 395/288 |
| 5,535,340 A | * | 7/1996 | Bell et al. ................ | 710/112 |
| 5,708,794 A | * | 1/1998 | Parks et al. .............. | 711/154 |
| 5,764,929 A | * | 6/1998 | Kelley et al. ............ | 710/107 |
| 5,850,530 A | * | 12/1998 | Chen et al. .............. | 710/113 |
| 5,870,567 A | * | 2/1999 | Hausauer et al. ........ | 710/101 |
| 5,951,663 A | * | 9/1999 | Jayakumar et al. ...... | 710/107 |
| 6,047,120 A | * | 4/2000 | Bell ........................ | 395/500.48 |
| 6,216,190 B1 | * | 4/2001 | Chin et al. ............... | 710/128 |
| 6,275,887 B1 | * | 8/2001 | Derr et al. ............... | 710/129 |
| 6,327,636 B1 | * | 12/2001 | Guthrie et al. .......... | 710/119 |

OTHER PUBLICATIONS

Intel Bus Functional Description, Jun. 1, 1995, PCI Local Bus Specification, Revision 2.1, pp. 6–24—6–33 (pub. by: PCI Special Interest Group).

* cited by examiner

Primary Examiner—Sumati Lefkowitz
(74) Attorney, Agent, or Firm—Park, Vaughan & Fleming LLP

(57) ABSTRACT

One embodiment of the present invention provides a method that supports multiple delayed read transactions between a host bus and a peripheral bus in a computer system. The method operates by receiving a first request that is a read operation from the host bus that is directed to the peripheral bus. The first request is stored in a first buffer and sent to the peripheral bus, so that the first request will be processed when the peripheral bus becomes available. Next, the system waits to receive a pipelined request that is a read operation from the host bus that is directed to the peripheral bus. If such a pipelined request is received, the system stores the pipelined request in a second buffer, and sends the pipelined request to the peripheral bus, so that the pipelined request will be processed when the peripheral bus becomes available. Next, the system issues a retry request across the host bus. This retry request causes both the first request and the pipelined request to be retried at a later time on the host bus so that the host bus can be freed up for other transactions while the first request and the pipelined request are in process on the peripheral bus. In one embodiment of the present invention, if the first request is a read operation that was previously requested, the system determines if read data from the previous request has been returned by the peripheral bus. If so, the system returns the read data across the host bus to complete the first request. Otherwise, the system issues a retry request across the host bus to cause the first request to be retried at a later time.

17 Claims, 3 Drawing Sheets

METHOD FOR SUPPORTING MULTIPLE DELAYED READ TRANSACTIONS BETWEEN COMPUTER BUSES

RELATED APPLICATION

The subject matter of this application is related to the subject matter in a co-pending non-provisional application by the same inventor(s) as the instant application and filed on the same day as the instant application entitled, "Apparatus for Supporting Multiple Delayed Read Transactions Between Computer Buses," having Ser. No. 09/352,720, and filing date Jul. 13, 1999.

BACKGROUND

FIELD OF THE INVENTION

The present invention relates to the design of computer system buses for transferring data between computer system components. More specifically, the present invention relates to a system that supports multiple delayed read transactions between computer buses.

RELATED ART

In order to improve computer system performance, some processors, such as the Intel Pentium, are designed to drive an additional request across a computer system bus before the current bus request is completed. This technique is known as "bus pipelining." (The Intel Pentium is manufactured by the Intel Corporation of Santa Clara, Calif.

Bus pipelining improves computer system performance because more than one bus transaction can be processed at the same time. However, this performance advantage can be lost when both requests are read operations directed from a processor bus, such as the Pentium Processor Bus, to a peripheral bus, such as the PCI bus. This is due to the fact that on certain peripheral buses, such as the PCI bus, a bus master can send a retry command back to the processor if the current request is delayed or cannot otherwise be completed immediately. When such a retry command is received by a processor bus, such as the Pentium Processor Bus, the retry command causes both the current request and the pipelined request to be terminated and re-attempted by the processor. (The term "Pentium Processor Bus" as used in this specification refers to a bus adhering to the protocol described in Volume 1 of the "The Pentium Family Developer's Manual," published in 1995 by the Intel Corporation.)

Consequently, in order to maintain ordering of transactions on the processor bus, the pipelined read request cannot be given to the peripheral bus until the current read request is guaranteed to complete. This removes the performance advantage of pipelining.

What is needed is a system that allows a pipelined read request to proceed in parallel with a current read request on a peripheral bus in spite of the fact that a retry on a processor bus causes all requests on the processor bus to be terminated and retried.

SUMMARY

One embodiment of the present invention provides a method that supports multiple delayed read transactions between a host bus and a peripheral bus in a computer system. The method operates by receiving a first request from the host bus that is directed to the peripheral bus. The first request is stored in a first buffer and sent to the peripheral bus, so that the first request will be processed when the peripheral bus becomes available. If the first request is a read operation, the system waits to receive a pipelined request that is a read operation from the host bus that is directed to the peripheral bus. If such a pipelined request is received, the system stores the pipelined request in a second buffer, and sends the pipelined request to the peripheral bus, so that the pipelined request will be processed when the peripheral bus becomes available. Next, the system issues a retry request across the host bus. This retry request causes both the first request and the pipelined request to be retried at a later time on the host bus so that the host bus can be freed up for other transactions while the first request and the pipelined request are in process on the peripheral bus.

In one embodiment of the present invention, if the first request is a read operation that was previously requested, the system determines if read data from the previous request has been returned by the peripheral bus. If so, the system returns the read data across the host bus to complete the first request. Otherwise, the system issues a retry request across the host bus to cause the first request to be retried at a later time.

In one embodiment of the present invention, waiting to receive the pipelined request includes waiting a predetermined amount of time for the pipelined request. In a variation on this embodiment, this includes accessing a programmable counter containing the predetermined amount of time.

In one embodiment of the present invention, the first buffer and the second buffer are located on a host bridge that couples together the host bus and the peripheral bus. In a variation on this embodiment, the host bridge includes a host slave module that acts as a slave device on the host bus, and a peripheral master module that acts as a master device on the peripheral bus.

In one embodiment of the present invention, the system receives a programmable delay enable signal that enables delayed read operations.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
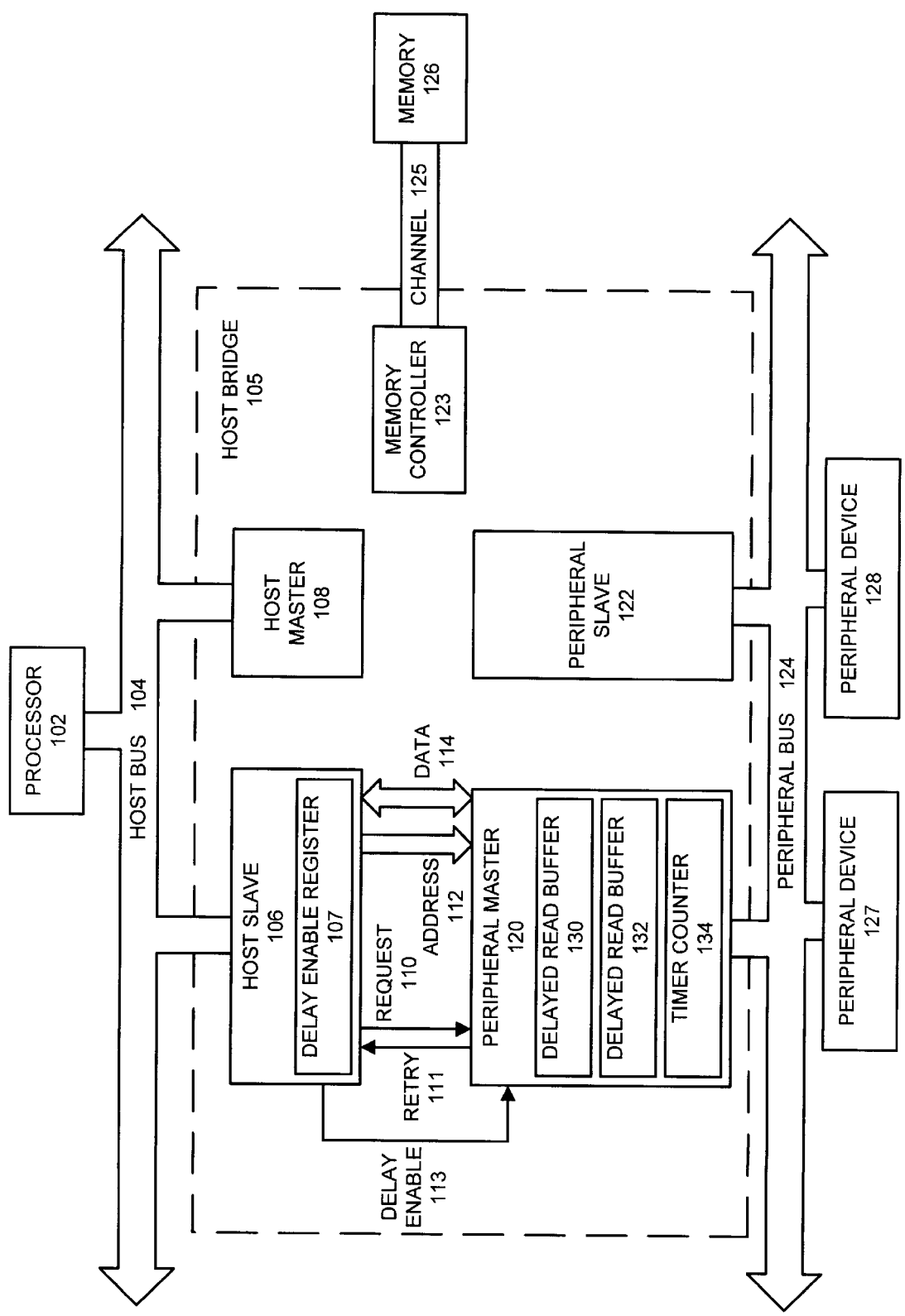
FIG. 1 illustrates a computer system including a host bus and a peripheral bus coupled together by a host bridge in accordance with an embodiment of the present invention.

FIG. 1 illustrates a computer system including a host bus 104 and a peripheral bus 124 coupled together by a host bridge 105 in accordance with an embodiment of the present invention. The computer system illustrated in FIG. 1 additionally includes processor 102, memory 126 and peripheral devices 127 and 128.

Processor 102 is coupled to host bridge 105 through host bus 104. Processor 102 may include any type of computational engine for executing code and data stored in memory 126. For example, processor 102 may include a microprocessor, a mainframe processor, a digital signal processor, a graphics processor or a device controller. Host bus 104 may include any type of communication channel for coupling processor 102 to other devices in the computer system, such a host bridge 105. In one embodiment of the present invention, host bus 104 includes a Pentium Processor Bus. Memory 126 is coupled to host bridge 105 through channel 125. Memory 126 may include any type of semiconductor memory for storing code and/or data for execution by processor 102. Channel 125 may include any type of communication channel for coupling memory 126 to other devices in the computer system, such as host bridge 105. Peripheral devices 127 and 128 are coupled to host bridge 105 through peripheral bus 124. Peripheral devices 127 and 128 may include any type of peripheral devices that can be integrated into a computer system. For example, peripheral devices 127 and 128 may include, a disk drive, a graphics controller, a keyboard or a network interface controller (NIC). Peripheral bus 124 may include any type communication channel for coupling peripheral devices 127 and 128 to host bridge 105. In one embodiment of the present invention, peripheral bus 124 includes a PCI bus.

Host bridge 105 includes circuitry for coupling together computer system components, such as host bus 104 memory 126 and peripheral bus 124. To this end, host bridge 105 includes host slave 106, host master 108, memory controller 123, peripheral master 120 and peripheral slave 122. Memory controller 123 controls communications with memory 126. These communications typically originate from processor 102. However, they may also originate from peripheral devices 127 and 128 during DMA accesses.

Host slave 106 is a slave device that can process requests from a host master, such as processor 102, across host bus 104. In the illustrated embodiment, host slave 106 includes delay enable register 107. Delay enable register 107 includes a single bit that can be programmed by processor 102 to enable or disable delayed read operations between host bus 104 and peripheral bus 124. Host master 108 is a bus master device that can gain control of host bus 104 to perform data transfers across host bus 104.

Similarly, peripheral slave 122 is a slave device that can process requests from a peripheral master, such peripheral device 128, across peripheral bus 124. Peripheral master 120 is a bus master device that can gain control of peripheral bus 124 to perform data transfers across peripheral bus 124.

In the illustrated embodiment, peripheral master 120 includes delayed read buffer 130, delayed read buffer 132 and timer counter 134. Delayed read buffers 130 and 132 store pending delayed read transactions that are waiting to be completed across peripheral bus 124. Timer counter 134 is a programmable timer that specifies how long to wait for a pipelined read operation after a read operation has been received from host bus 104. Timer counter 134 is described in more detail below with reference to FIG. 3.

In FIG. 1, host slave 106 and peripheral master 120 are coupled together by a number of signal lines. Request signal 110 is passed from host slave 106 to peripheral master 120 to indicate that a request is being transferred from host slave 106 to peripheral master 120. This request also includes address signals 112, which specify the address of the target of the request on peripheral bus 124. The request additionally includes data signals 114, which carry data to and from host slave 106. Retry signal 111 is passed from peripheral master 120 to host slave 106 to indicate that a pending request will take a significant amount of time to process on peripheral bus 124, and that the requesting device on host bus 104 should retry the request at a later time. Delay enable signal 113 originates from programmable delay enable register 107. This signal indicates whether or not delayed operations have been enabled by processor 102.

Operation of Host Slave

Figure 2:
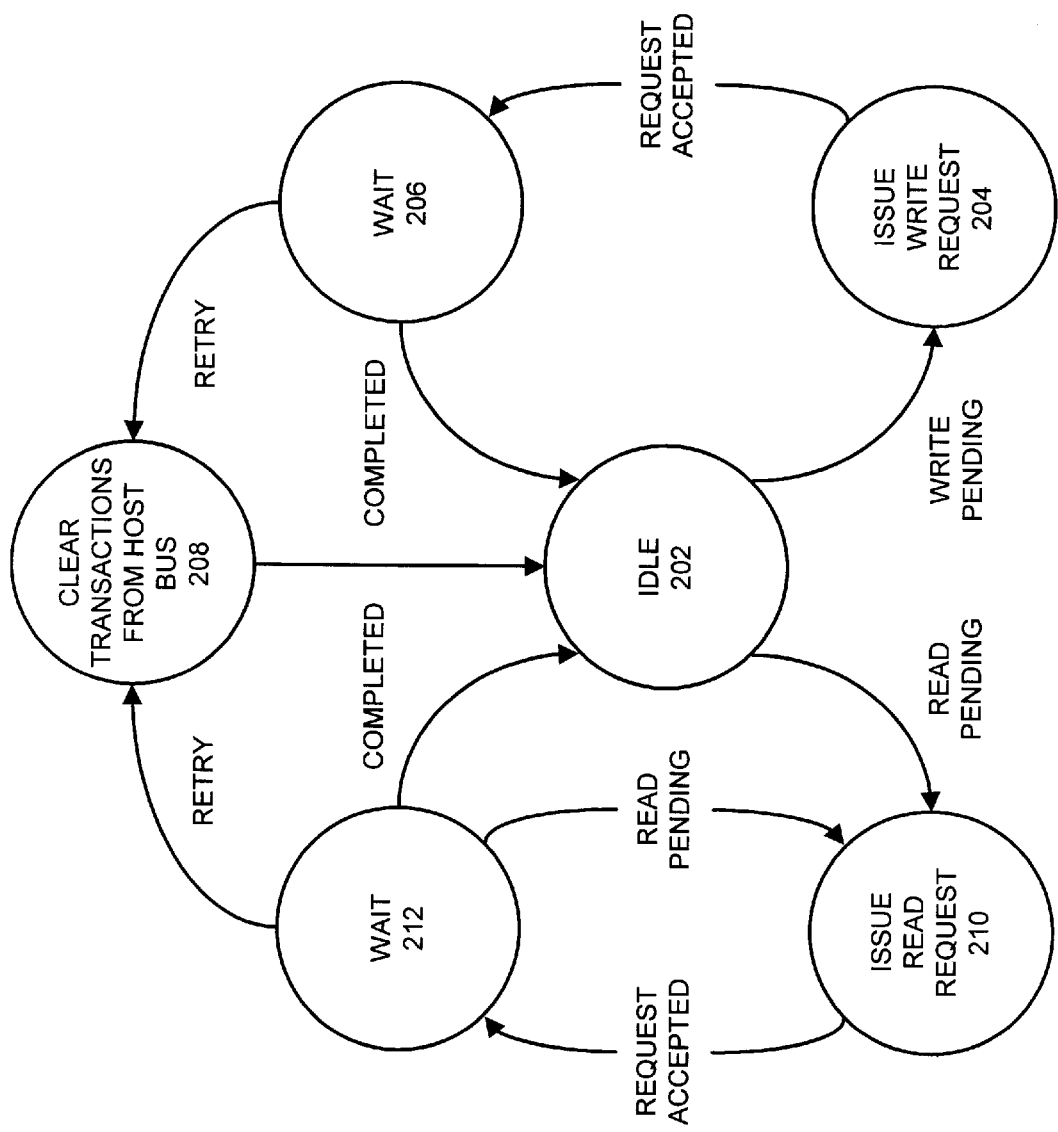
FIG. 2 illustrates part of the state machine for a host slave module on the host bridge in accordance with an embodiment of the present invention.

FIG. 2 illustrates part of the state machine controlling host slave 106 on the host bridge in accordance with an embodiment of the present invention. Host slave 106 starts in an idle state (state 202). When a write request is received across host bus 104 to a peripheral device on peripheral bus 124, a write operation is pending. This causes host slave 106 to issue the write request to peripheral master 120 (state 204). Next, peripheral master 120 accepts the write request. This causes host slave 106 to wait for the write request to complete (state 206). Note that peripheral master 120 will process the write request when peripheral master 120 is able to gain control of peripheral bus 124. If peripheral master 120 immediately completes the write request, or if the write request has returned from a previous write request that caused a retry, host slave 106 finishes the corresponding write request on host bus 104 and returns to the original idle state (state 202). If peripheral master 120 forwards a retry command back to host slave 106, host slave 106 sends a "back off" command across host bus 104, which causes all pending transactions to be cleared from host bus 104 (state 208). This includes clearing all pipelined transactions. In one embodiment of the present invention, the back off command is the "BOFF#" command supported by the Pentium Processor Bus. Next, host slave 106 returns to the original idle state (state 202).

If a read request is received across host bus 104 and is directed to a peripheral device on peripheral bus 124, a read operation is pending. This causes host slave 106 to issue the read request to peripheral master 120 (state 210). Next, peripheral master 120 accepts the read request. This causes host slave 106 to wait for the read request to complete (state 212). Note that peripheral master 120 will process the read request when peripheral master 120 is able to gain control of peripheral bus 124. If peripheral master 120 immediately completes the read request, or if the read request has returned from a previous read request that caused a retry, host slave 106 finishes the corresponding read request on host bus 104 and returns to the original idle state (state 202). If peripheral master 120 forwards a retry command back to host slave 106, host slave 106 sends a back off command across host bus 104, which causes all pending transactions to be cleared from host bus 104 (state 208). This includes clearing all pipelined transactions. If a subsequent pipelined read request is pending, host slave 106 issues the pipelined read request to peripheral master 120 (state 210). After the pipelined read request is accepted by peripheral master 120, host slave 106 waits for the read requests to complete or retry (state 212). Next, host slave 106 returns to the original idle state (state 202).

Operation of Peripheral Master

Figure 3:
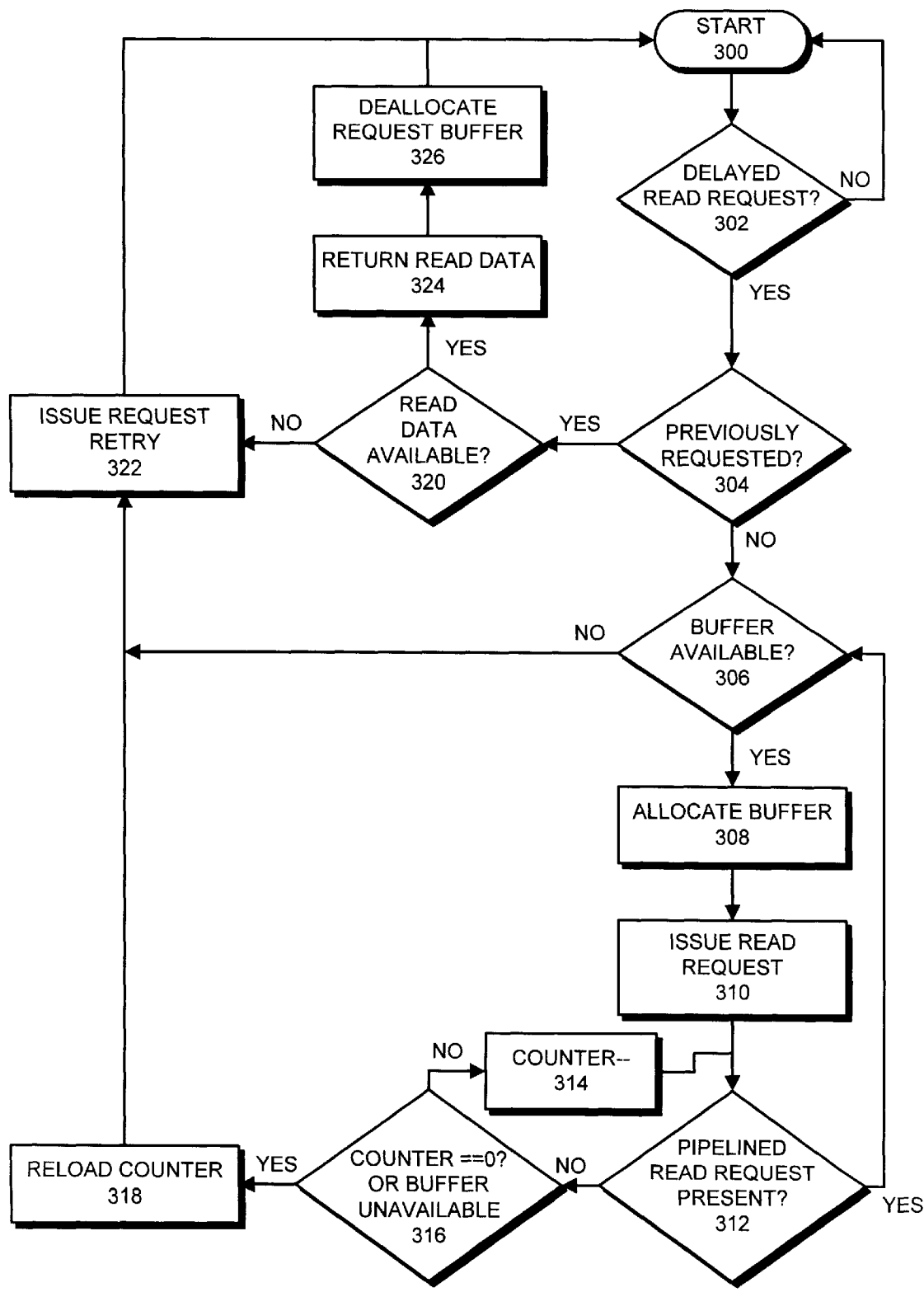
FIG. 3 presents a flow chart of some of the actions of a peripheral master on the host bridge in accordance with an embodiment of the present invention.

FIG. 3 presents a flow chart illustrating some of the actions of peripheral master 120 in performing a delayed read request in accordance with an embodiment of the present invention. Upon receiving a request from host slave 106, peripheral master 120 determines if the request is a delayed read request (step 302). If the request is not a delayed read operation, peripheral master 120 returns to the start (step 300) to be processed by conventional request processing mechanisms. If the request is a delayed read request, peripheral master 120 determines if the read request has been previously requested (step 304).

If so, peripheral master 120 determines if read data from the previous request has returned from peripheral bus 124 and is available (step 320). If not, peripheral master 120 issues a retry request (step 322), and returns to wait for another request (step 300). If the read data has returned and is available, peripheral master 120 returns the read data to host slave 106 (step 324). Next, peripheral master 120 deallocates a request buffer (step 326), and returns to wait for another request (step 300).

If the read request has not been previously requested, peripheral master 120 determines if there is a buffer available for the read request (step 306). If not, other requests must have grabbed all of the available buffers. This causes peripheral master 120 to issue a retry request (step 322) and return to wait for another request (step 300). If there is a buffer available, peripheral master 120 allocates a buffer for the pending delayed read request (step 308). Next, peripheral master 120 issues a read request to peripheral bus 124 (step 310). This causes the read request to be sent across peripheral bus 124 when peripheral master 120 is able to grab control of peripheral bus 124. Next, peripheral master 120 determines if there is a pipelined read request present (step 312). If so, peripheral master 120 returns to step 306 to process the pipelined read request.

If not, peripheral master 120 enters a wait loop (steps 312, 314 and 316) that continues to ask if a pipelined read request is present until timer counter 134 expires or if a buffer is unavailable. Timer counter 134 is loaded with a pre-selected value to set a specific delay period in which peripheral master 120 waits for a pipelined read operation. Finally, if the timer expires without a pipelined request being detected or if a buffer is unavailable (which indicates that it is not necessary to wait for the pipelined read operation), peripheral master 120 issues a retry request (step 322) and returns to wait for another request (step 300).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method that supports multiple delayed read transactions between a host bus and a peripheral bus in a computer system, comprising:

receiving a first request from the host bus that is directed to the peripheral bus;

storing the first request in a first buffer;

sending the first request to the peripheral bus, so that the first request will be processed when the peripheral bus becomes available;

if the first request is a read operation, waiting a predetermined amount of time to receive a pipelined request from the host bus that is directed to the peripheral bus, the pipelined request being received before the first request is completed;

if the pipelined request is received and if the pipelined request is a read operation, storing the pipelined request in a second buffer, and sending the pipelined request to the peripheral bus, so that the pipelined request will be processed when the peripheral bus becomes available; and issuing a retry request across the host bus, the retry request causing both the first request and the pipelined request to be retried at a later time on the host bus so that the host bus can be freed up for other transactions while the first request and the pipelined request are in process on the peripheral bus.

2. The method of claim 1, wherein if the first request is a read operation that was previously requested:

determining if read data from the previous request has been returned by the peripheral bus;

if the read data has been returned by the peripheral bus, returning the read data across the host bus; and if the read data has not been returned by the peripheral bus, issuing a retry request across the host bus to cause the first request to be retried at a later time.

3. The method of claim 1, wherein waiting the predetermined amount of time for the pipelined request includes accessing a programmable counter containing the predetermined amount of time.

4. The method of claim 1, wherein sending the first request to the peripheral bus includes directing the first request to a peripheral device on the peripheral bus.

5. The method of claim 1, wherein receiving the first request includes receiving the first request from a processor on the host bus.

6. The method of claim 1, wherein storing the first request in the first buffer and storing the second request in the second buffer includes storing the first request and the second request on a host bridge that couples together the host bus and the peripheral bus.

7. The method of claim 6, wherein storing the first request and the second request includes storing the first request and the second request on the host bridge that includes a host slave module that acts as a slave device on the host bus and a peripheral master module that acts as a master device on the peripheral bus.

8. The method of claim 1, wherein receiving the first request from the host bus includes receiving the first request from a Pentium Processor Bus.

9. The method of claim 1, wherein sending the pipelined request to the peripheral bus includes sending the pipelined request to a PCI bus.

10. The method of claim 1, further comprising receiving a programmable delay enable signal that enables delayed read operations.

11. The method of claim 1, further comprising, if the first request has been sent to the peripheral bus:

becoming a bus master on the peripheral bus;

completing the first request across the peripheral bus; and if the pipelined request has been sent to the peripheral bus, completing the pipelined request across the peripheral bus.

12. A method that supports multiple delayed read transactions between a host bus and a peripheral bus in a computer system, comprising:

receiving a first request from a processor on the host bus that is directed to a peripheral device on the peripheral bus;

storing the first request in a first buffer located on a host bridge that couples together the host bus and the peripheral bus;

sending the first request to the peripheral bus, so that the first request will be processed when the peripheral bus becomes available;

if the first request is a read operation that was previously requested,
determining if read data from the previous request has been returned by the peripheral bus,
if the read data has been returned by the peripheral bus, returning the read data across the host bus, and
if the read data has not been returned by the peripheral bus, issuing a retry request across the host bus to cause the first request to be retried at a later time;

if the first request is a read operation, waiting a predetermined amount of time to receive a pipelined request from the host bus that is directed to the peripheral bus, the pipelined request being received before the first request is completed;

if the pipelined request is received and if the pipelined request is a read operation,
storing the pipelined request in a second buffer on the host bridge, and
sending the pipelined request to the peripheral bus, so that the pipelined request will be processed when the peripheral bus becomes available; and issuing a retry request across the host bus, the retry request causing both the first request and the pipelined request to be retried at a later time on the host bus so that the host bus can be freed up for other transactions while the first request and the pipelined request are in process on the peripheral bus; and if the first request has been sent to the peripheral bus,
becoming a bus master on the peripheral bus,
completing the first request across the peripheral bus, and
if the pipelined request has been sent to the peripheral bus, completing the pipelined request across the peripheral bus.

13. The method of claim 12, wherein waiting the predetermined amount of time for the pipelined request includes accessing a programmable counter containing the predetermined amount of time.

14. The method of claim 12, wherein storing the first request and storing the second request includes storing the first request and storing the second request on the host bridge that includes a host slave module that acts as a slave device on the host bus and a peripheral master module that acts as a master device on the peripheral bus.

15. The method of claim 12, wherein receiving the first request from the host bus includes receiving the first request from a Pentium Processor Bus.

16. The method of claim 12, wherein sending the pipelined request to the peripheral bus includes sending the pipelined request to a PCI bus.

17. The method of claim 12, further comprising receiving a programmable delay enable signal that enables delayed read operations.

* * * * *